United States Patent Office 3,097,294
Patented July 9, 1963

3,097,294
ELECTRIC ARC WELDING AND WIRE THEREFOR
Robert A. Kubli, Scotch Plains, and William B. Sharav, Short Hills, N.J., assignors to Union Carbide Corporation, a corporation of New York
No Drawing. Filed Mar. 3, 1961, Ser. No. 93,039
3 Claims. (Cl. 219—145)

This invention relates to electric arc welding where an arc is struck between a workpiece to be welded and a consumable welding wire and more particularly to an improved welding wire for making steel welds having high-impact properties even at low temperatures.

The inventive wire is ideally suited to submerged-arc or melt welding which as disclosed in U.S. Patent No. 2,043,960 involves the deposition of metal from a bare consumable electrode rod or wire under a blanket of granular welding composition. Such process has been widely accepted by virtue of advantages including speed, favorable properties, and mechanization. However, the welding wire of the invention may also be used in shielded inert gas metal arc welding.

According to the present invention, there is provided a novel welding wire that contains the following ingredients:

TABLE

| Material | Range (in weight percent) |
|---|---|
| Carbon | 0.05–0.18. |
| Manganese | 1.00–2.00. |
| Phosphorous | 0.035 max. |
| Sulphur | 0.035 max. |
| Silicon | 0.25 max. |
| Chromium | 0.20–0.50. |
| Vanadium | 0.10 max. |
| Nickel | 1.50–3.00. |
| Aluminum | 0.05 max. |
| Copper | 0.50 max. |
| Molybdenum | 0.30–0.60. |

This invention also provides a method of electric arc welding which comprises feeding a consumable wire consisting of

TABLE

| Material | Range (in weight percent) |
|---|---|
| Carbon | 0.05–0.18. |
| Manganese | 1.00–2.00. |
| Phosphorous | 0.035 max. |
| Sulphur | 0.035 max. |
| Silicon | 0.25 max. |
| Chromium | 0.20–0.50. |
| Vanadium | 0.10 max. |
| Nickel | 1.50–3.00. |
| Aluminum | 0.05 max. |
| Copper | 0.50 max. |
| Molybdenum | 0.30–0.60. | toward the work-in-circuit to be welded, striking a welding arc between such wire and said work, feeding such wire toward such work to be welded whereby a weld metal joint is made exhibiting a notch sensitivity of at least 15 ft. lbs. at −50 degs. F. and a yield strength of from 80,000–120,000 p.s.i.

Industrial requirements for weldments in structural type steels such as HY–80, T–1, and nickel alloy steels demand greater impact properties at lower temperatures than were heretofore possible. Such weldments as pressure vessels, bridges, and heavy structures, particularly when subjected to relatively low temperatures, require as a prerequisite joined steel members which maintain relatively high-impact properties.

To date, there has been no commercially available submerged-arc welding wire which will develop high notch-tough properties in a high yield strength steel. Certain commercial wires which have been used in the shielded inert gas metal arc process have been tried with the submerged-arc welding process with little success. Such wires are not sufficiently alloyed to develop adequate tensile properties and at the same time so balanced in composition to supply the impact properties. Because of welding economics, mechanized submerged-arc welding has been applied broadly in the pressure-vessel industry because of its low cost and consistently high quality. However, because of the lack of a suitable composition, together with a suitable wire, this superior method could not be used for high impact high tensile applications. As a consequence, covered arc welding electrodes, manually applied, have of necessity been used at great economic sacrifice. The inventive wire fills this need.

The primary object of this invention is to provide a welding wire that is capable of successfully producing high quality welded joints having the ability to withstand relatively high-impact forces, especially at relatively low temperatures.

Another object is to provide a welding process for high yield strength steel wherein welds are obtainable which are characterized by notch-properties heretofore unobtainable.

Other objects and advantages will become apparent from a study of the following detailed disclosure.

The notch toughness or impact resistance of steel is a function of the temperature at which testing is performed. Characteristically, carbon and low-alloy steels exhibit their maximum energy absorption levels at room temperature and above. At lower temperatures impact resistance decreases. During such change in the impact properties of steel, there exists a temperature range wherein a transition from ductile to brittle failure exists. Such temperature is a useful index to metallurgists, since steel subjected to impact loads at and below the transition temperature can fail suddenly and catastrophically.

A further consideration in an examination of impact properties is the effect of the desired tensile levels upon the impact properties of the steel. Usually, as the tensile strength of the steel is raised, a significant decrease in impact resistance is experienced. Hence, for a careful evaluation it is necessary to consider the tensile level when studying impact resistance levels.

The development of welding wire for producing steel welds with high-impact properties must proceed largely along empirical and intuitive lines, because little is known scientifically exactly as to what controls impact properties. Weld metal chemical analysis is a factor, but identical analyses can occur in welds with totally different impact properties. Likewise, grain size and microstructure of the weld are factors, but steels which from observation and analysis appear identical in all or most other respects still differ widely in impact properties.

The principal and most desirable alloying elements employed in welding wires to be used for joining notch-tough steels are nickel, manganese, molybdenum, and chromium. These elements have been found to be most favorable for their beneficial effect upon the tensile strength of a weld joint and yet exhibit minimum deleterious effects upon the impact strength. The use of several such elements is desirable because there appears to be a maximum quantity of any one element which can be used without deleterious effect on impact values.

Nickel is especially valuable in regard to impact values and actually decreases the transition temperature from brittle to ductile. Nickel has been used in amounts up to 3½ percent; however, while the benefits to impact strength continue at this level, a tendency toward weld cracking develops and it is necessary to stay under this value for safety in commercial practice. The practical limit appears to be 3.00 percent.

Manganese has been used in amounts up to 2 percent; however, the greatest overall benefit seems to occur when the amount in the wire is adjusted to where the deposit contains about ½ of the nickel content or about 1.3 to 1.5 percent.

Aside from its contribution to tensile strength, some manganese would be necessary for deoxidation in the steel ingot for wire production.

Molybdenum is a good strengthener in amounts up to approximately 0.5 percent, and in connection with welding A.S.T.M. specification A–203D (3.5 percent nickel bearing steel) steel, molybdenum seems also to be beneficial in controlling cracking when nickel is used in amounts near the 3.5 percent value.

Chromium is not necessary to achieve the 100,000 p.s.i. yield strength level in T–1 steel; however, it may be added in small amounts (0.35) without harm to impact values if additional reserve over the minimum is desired.

The elements carbon and vanadium, have been demonstrated to be harmful to impact values. Some carbon must be tolerated both because in practice it is unavoidable and in limited amounts does help produce the yield and tensile strength desired while maintaining a microstructure commensurate with good impact properties. In multiple-pass welding on commercial steels, the carbon level tends to reach an equilibrium value of 0.05 percent and smaller amounts in the wire are not reflected in a lowering of this value in the weld metal. There is little value therefore in reducing the amount of carbon in the wire below this value and indeed an additional expense is incurred in doing so. A carbon level of 0.17 percent in the wire (which produces 0.10 percent in the weld) has been successfully used to produce welds meeting T–1 steel impact requirements of 15 ft. lbs. (full size Charpy V minimum at −50 degs. F.

While vanadium is a powerful strengthener, as a carbide former its tendency toward carbide precipitation on stress relief and consequent impairment of notch-toughness lessens its utility for general use. It has been determined, however, that vanadium up to 0.10 percent can be tolerated, even for stress-relieved applications, provided that the carbon level is below 0.05 percent. This restriction on the carbon level limits the use of vanadium to steels generally below the 90,000 p.s.i. yield level and limits its area of utility.

Silicon is used as a deoxidizing agent; however, its use should be limited in welding wire designed for notched-tough weld metals. Since low silica in the welding composition was found to be helpful, replacing it with silicon derived from the wire would not be beneficial. Silicon up to 0.25 percent has no adverse effect.

The preferred wire composition according to the invention is comprised of

TABLE I

| Material | Weight percent |
|---|---|
| Carbon | 0.14. |
| Manganese | 1.80. |
| Phosphorous | 0.01 max. |
| Sulphur | 0.01 max. |
| Silicon | 0.15 max. |
| Chromium | 0.30. |
| Vanadium | 0.05 max. |
| Nickel | 2.60. |

TABLE I—Continued

| | Weight percent |
|---|---|
| Aluminum | 0.05 max. |
| Copper | 0.25 max. |
| Molybdenum | 0.50. |

A number of wires were investigated in the course of the development.

The standard multipass welding procedure using a 60 deg. V joint upon 1 in. thick plate welded at a nominal condition of 500 amperes D.C.R.P., 30 volts and 15 i.p.m., was used to evaluated such wires as noted in Table II:

TABLE II

| Wire | C | S | P | Mn | Si | Cr | Ni | Mo | V | Cu | Al |
|---|---|---|---|---|---|---|---|---|---|---|---|
| A | 0.07 | 0.005 | 0.005 | 1.40 | | | 2.65 | 0.55 | | 0.13 | 0.02 |
| B | 0.06 | 0.010 | 0.010 | 1.37 | 0.02 | | 2.23 | 0.49 | 0.11 | 0.25 | 0.02 |
| C | 0.17 | 0.010 | 0.003 | 1.80 | 0.15 | 0.34 | 2.67 | 0.55 | | 0.50 | 0.02 |
| D | 0.12 | 0.004 | 0.003 | 1.81 | 0.05 | 0.03 | 2.68 | 0.55 | | 0.21 | 0.02 |
| E | 0.08 | 0.026 | 0.005 | 1.80 | 0.07 | 0.01 | 2.53 | 0.53 | | 0.24 | 0.02 |

Tables III and IV below show the mechanical properties obtained with the submerged-arc welding process using wires noted in Table II.

TABLE III

| Wire | Ultimate tensile strength[1] | | Yield strength[1] | | Elongation, percent in 2 in. | | Reduction of area, percent | |
|---|---|---|---|---|---|---|---|---|
| | A.W.[2] | S.R.[3] | A.W.[2] | S.R.[3] | A.W.[2] | S.R.[3] | A.W.[2] | S.R.[3] |
| A | 105 | 100 | 93 | 87 | 18 | 21 | 58 | 60 |
| B | 109 | 114 | 101 | 108 | 18 | 24 | 55 | 57 |
| C | 134 | 130 | 118 | 114 | 18 | 18 | 54 | 54 |
| D | 124 | 113 | 115 | 105 | 15 | 20 | 55 | 60 |
| E | | 112 | | 101 | | 20 | | 54 |

[1] P.s.i. in thousand pound units.
[2] As welded.
[3] Stress relieved.

TABLE IV

Charpy-V Impact, Ft. Lbs.

| Wire | Temperature, °F. | | | | | |
|---|---|---|---|---|---|---|
| | Room temperature | | −50 | | −100 | |
| | A.W.[1] | S.R.[2] | A.W.[1] | S.R.[2] | A.W.[1] | S.R.[2] |
| A | 44 | 45 | 30 | 37 | 17 | 19 |
| B | 46 | 42 | 20 | 14 | | |
| C | 36 | 43 | 25 | 32 | 23 | 28 |
| D | 38 | 50 | 31 | 35 | 22 | 23 |
| E | | 38 | | 18 | | 15 |

[1] As welded.
[2] Stress relieved.

According to Table III, a significant change in mechanical properties is apparent when comparing wires A and B. This variance is due to the presence of vanadium in wire B and the lack of it in wire A. Such vanadium combining with carbon caused precipitation hardening in the deposit made with wire B and as an aftermath, the tensile strength of the weld metal tended to increase upon proper stress relieving. Table III illustrates this where wire A (not containing vanadium) results in a drop in tensile strength upon strength relief. On the other hand, wire B (containing vanadium) experiences a noticeable increase in tensile level upon stress reliving. Except for the presence of vanadium, wires A and B are substantially alike (Table I).

Table IV relates effect of the precipitation phenomena upon impact properties and it is further observed that wire A at −50 degs. F. experiences an increase in impact strength upon stress relieving; whereas, wire B indicates a significant decrease in impact properties at this same temperature. These tests tend to establish that vanadium is not desirable for raising the tensile strength because it adversely affects impact strength.

Present-day commercial requirements for quenches and tempered steels state that the minium acceptance yield strength level is 100,000 p.s.i. Whereas, in other instances the A.S.M.E. Boiler Code stipulates an ultimate tensile strength of 115,000 p.s.i. as a requirement and does not make direct reference to the yield strength. Impact requirements are not specified in the A.S.M.E. Code for quenches and tempered steels, but on specific design applications, fabricators usually add impact requirements corresponding to the minimum values guaranteed by the base plate manufacturer. As an example, one manufacturer guarantees 15 ft. lbs. (full size Charpy-Keyhole) at −50 degs. F. and 20 ft. lbs. (full size Charpy-V at ±10 degs. F.

Wire A does not provide the minimum yield strength requirements (100,000 p.s.i.) demanded for the welding of commercially available T–1 steel. On the other hand, wire B was considered unsatisfactory because of the unfavorable impact properties exhibited at low temperatures. Such undesirable effect on impact properties is further magnified with an increase in stress relieving time (one hour of stress relieving per inch of material at 1050 degs. F.). This requirement is in accordance with the A.S.M.E. Boiler Code.

It was next decided to approach the objective of this invention by a modification of wire A. With the addition of chromium and an increase in the amounts of carbon and manganese (Table II) new and favorable results were exhibited with wires C and D. Table III illustrates the mechanical properties of these wires. As shown, the yield strength value (stress relieved) for wire C, was 114,000 p.s.i.; far in excess of required 100,000 p.s.i. level. Thereafter, wire C was modified wherein it contains a lesser amount of chrome and carbon. This new wire, namely wire D, produced a yield strength (steress relieved) of 105,000 p.s.i. (Table III). It appears that the most desirable analysis range resides between wires C and D, because the mechanical properties exhibited fall within the required range.

Furthermore, according to Table IV, the impact values for wires C and D are well above the minimum requirements necessary to weld T–1 steel. Such values range from 25 to 35 ft. lbs. Charpy-V (stress relieved or as welded) at −50 degs. F. It is apparent that these values far exceed the minimum requirements mentioned above.

Wire E was formulated to determine the maximum limits on the impurity element, sulphur, commensurate with good impact properties. This wire is similar in composition to wire A and produces weld metal having about 100,000 p.s.i. yield strength (stress relieved) but the impact properties are significantly poorer than any other wires evaluated containing low sulphur as shown in Table IV. A desirable limit is on the order of 0.01 max. Similar experiments on this family of alloy varying the element phosphorous have not been made but it is probable that phosphorous would react as does sulphur.

It is therefore, considered desirable to limit phosphorus to 0.01 max. also for best results.

While the invention has been described mainly relating to submerged-arc welding, the concept of the invention is not so limited. For example, wire similar to the composition disclosed in Table I, except containing additional deoxidizing elements, could be utilized for consumable wire inert-gas welding. It is customary to use higher silicon and small additions of aluminum, titanium, and zirconium for this purpose. A composition for inert-gas consumable wire welding is as follows:

| Constituent | Range |
| --- | --- |
| Carbon | 0.05–0.18. |
| Manganese | 1.00–2.00. |
| Phosphorous | 0.035 max. |
| Sulphur | 0.035 max. |
| Silicon | 0.40–0.60. |
| Chromium | 0.20–0.50. |
| Vanadium | 0.10 max. |
| Nickel | 1.50–3.00. |
| Copper | 0.50 max. |
| Molybdenum | 0.30–0.60. |
| Aluminum | 0.10 max.[1] |
| Titanium | 0.10 max.[1] |
| Zirconium | 0.10 max.[1] |

[1] Optional, depending on deoxidation potential desired.

What is claimed is:

1. A consumable ferritic welding wire for electric arc welding consisting of 1.00 to about 2.00 manganese, 1.50 to about 3.00 percent nickel, 0.30 to about 0.60 percent molybdenum, .05–0.18 percent carbon, a trace up to about 0.05 percent vanadium, up to 0.035 percent phosphorus, up to 0.035 percent sulphur, up to about 0.25 percent silicon, 0.20–0.50 percent chromium, up to about 0.05 percent aluminum, and up to about 0.50 percent copper, balance iron.

2. A welding wire as defined in claim 1 including a deoxidant taken from the class consisting of: up to 0.10 percent titanium and up to 0.10 percent zirconium.

3. A consumable welding wire for electric arc welding composed of the following: 0.14 percent carbon, 1.80 percent manganese, up to about 0.01 percent phosphorous, 0.01 percent sulphur, 0.15 percent silicon, 0.30 percent chromium, up to 0.05 percent vanadium, 2.60 percent nickel, 0.05 percent aluminum, 0.25 percent copper, and 0.50 percent molybdenum, balance iron.

References Cited in the file of this patent

UNITED STATES PATENTS

| 2,239,465 | Nepoti | Apr. 22, 1941 |
| 2,248,279 | Nepoti | July 8, 1941 |
| 2,810,818 | Rothschild | Oct. 22, 1957 |
| 2,863,981 | Thomas et al. | Dec. 9, 1958 |

FOREIGN PATENTS

| 762,801 | Great Britain | Dec. 5, 1956 |
| 780,788 | Great Britain | Aug. 7, 1957 |